United States Patent
Krumm et al.

(10) Patent No.: US 7,053,830 B2
(45) Date of Patent: May 30, 2006

(54) SYSTEM AND METHODS FOR DETERMINING THE LOCATION DYNAMICS OF A PORTABLE COMPUTING DEVICE

(75) Inventors: John C. Krumm, Redmond, WA (US); Eric J. Horvitz, Kirkland, WA (US)

(73) Assignee: Microsoft Corproration, Redmond, WA (US)

(*) Notice: Subject to any disclaimer, the term of this patent is extended or adjusted under 35 U.S.C. 154(b) by 0 days.

(21) Appl. No.: 11/188,433

(22) Filed: Jul. 25, 2005

(65) Prior Publication Data

US 2005/0270235 A1 Dec. 8, 2005

Related U.S. Application Data

(62) Division of application No. 10/610,190, filed on Jun. 30, 2003.

(51) Int. Cl.
*G01S 3/02* (2006.01)
*G06F 15/00* (2006.01)
*G06F 17/30* (2006.01)

(52) U.S. Cl. .................. 342/451; 342/463; 702/181; 707/7

(58) Field of Classification Search ............. None
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,084,546 A | 7/2000 | Wax et al. | |
| 6,140,964 A * | 10/2000 | Sugiura et al. | 342/464 |
| 6,269,246 B1 * | 7/2001 | Rao et al. | 455/456.3 |
| 6,393,294 B1 * | 5/2002 | Perez-Breva et al. | 455/456.5 |
| 6,466,232 B1 | 10/2002 | Newell et al. | |
| 6,513,046 B1 | 1/2003 | Abbott, III et al. | |
| 6,549,915 B1 | 4/2003 | Abbott, III et al. | |
| 6,747,675 B1 | 6/2004 | Abbott et al. | |
| 6,791,580 B1 | 9/2004 | Abbott et al. | |

(Continued)

FOREIGN PATENT DOCUMENTS

EP 001102399 A2 5/2001

(Continued)

OTHER PUBLICATIONS

Andy Harter, et al., A Distributed Location System for the Active Office, IEEE Network, 1994, pp. 62-70.

(Continued)

*Primary Examiner*—Gregory C. Issing
(74) *Attorney, Agent, or Firm*—Amin & Turocy, LLP

(57) ABSTRACT

A location system for locating and determining the motion and velocity of a wireless device. The methods include direct inferences about whether a device is in motion versus static based on a statistical analysis of the variation of radio signal strengths over time. The system is trained according to a sparse set of identified locations from which signal strengths are measured. The system uses the signal properties of the identified locations to interpolate for a new location of the wireless device. The system uses a probabilistic graph where the identified locations of the floor plan, expected walking speeds of pedestrians, and independent inference of whether or not the device is in motion are used to determine the new location of the device.

2 Claims, 11 Drawing Sheets

U.S. PATENT DOCUMENTS

| | | | |
|---|---|---|---|
| 6,801,223 B1 | 10/2004 | Abbott et al. | |
| 6,812,937 B1 | 11/2004 | Abbott et al. | |
| 6,839,027 B1* | 1/2005 | Krumm et al. | 342/465 |
| 6,842,877 B1 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2004/0008139 A1* | 1/2004 | Stone et al. | 342/451 |
| 2004/0176931 A1* | 9/2004 | Wright et al. | 702/189 |
| 2005/0034078 A1 | 2/2005 | Abbott et al. | |

FOREIGN PATENT DOCUMENTS

| | | | |
|---|---|---|---|
| EP | | 001109031 A1 | 6/2001 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994, pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1996, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference. Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting In Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, pp. 94-104, vol. 265—No. 3.

J. Krumm and E. Horvitz. LOCADIO: Inferring Motion and Location from Wi-Fi Signal Strengths, Proceedings of Mobiquitous 2004, pp. 4-14, Aug. 22-26, 2004.

S.S. Intile, et al. Tools for Studying Behavior and Technology in Natural Settings. In UBICOMP 2003, Springer-Verlag, 2003. 18 pages.

E. Horvitz, et al. Coordinate: Probabilistic Forecasting of Presence and Availability. In 18th Annual Conference on Uncertainty in AI (UAI) 2002. 10 pages.

E. Horvitz, et al. Attention-Sensitive Alerting. In Fifteenth conference on Uncertainty in Artificial Intelligence (UAI), 1999. 10 pages.

E. Horvitz, et al. Models of Attention In Computing and Communication: From Principles to Applications. Communications of the ACM. vol. 46 No. 3, 2003. 12 pages.

F. Sparacino. Sto(ry)chastics: A Bayesian Network Architecture for User Modeling and Computational Storytelling for Interactive Spaces. In UBICOMP 2003, Springer-Verlag, 2003, 18 pages.

D.J. Patterson, et al. Inferring High-Level Behavior from Low-Level Sensors. In UBICOMP 2003, Springer-Verlag, 2003. 18 pages.

J. Krum, et al. SmartMoveX on a Graph—An Inexpensive Active Badge Tracker. In UBICOMP 2002, Springer-Verlag, 2002. 8 pages.

J. Hightower and G. Borriello. Location Systems for Ubiquitous Computing. Computer, 2001. vol. 34 No. 8, pp. 57-66, 2001.

M. Hazas, et al. A Novel Broadband Ultrasonic Location System. In UBICOMP 2002, Springer-Verlag, 2002. 17 pages.

D. Cox, et al. IntelliBadge: Towards Providing Location-Aware Value-Added Services at Academic Conferences. In UBICOMP 2003, Springer-Verlag, 2003. 17 pages.

P. Bahl and V.N. Padmanabhan, Radar: An In-Building RF-Based Location and Tracking System. In IEEE Infocom 2000. 10 pages.

P. Bahl, et al. Enhancements to the RADAR User Location and Tracking System. Microsoft Research, 2000. 13 pages.

A.M. Ladd, et al. Robotics-Based Location Sensing using Wireless Ethernet. In Eighth International Conference on Mobile computing and Networking, 2002. 12 pages.

J. Small, et al. Determining User Location for Context Aware Computing through the Use of a Wireless LAN Infrastructure. Carnegie Mellon University, 2000. 8 pages.

P. Castro, et al, A Probabilistic Room Location Service for Wireless Networked Environments. In UBICOMP 2001, Springer-Verlag, 2001. 19 pages.

W.G. Griswold, et al. ActiveCampus- Sustaining Educational Communities through Mobile Technology. University of California, San Diego, 2002. 19 pages.

K. Koile, et al. Activity Zones for Context-Aware Computing. In UBICOMP 2003, Springer-Verlag, 2003. 18 pages.

L.R. Rabiner. A Tutorial on Hidden Markov Models and Selected Applications in Speech Recognition. Proceedings of the IEEE, vol. 77 No. 2, pp. 257-285, 1989.

S. Thrun, et al, Robust Monte Carlo Localization for Mobile Robots. Artificial Intelligence, vol. 128 No. 1-2, pp. 99-141, 2001.

J.J. Fruin. Pedestrian Planning and Design. 1971, New York: Metropolitan Association of Urban Designers and Environmental Planners.

Ladd, Andrew, et al. "Robotics_Based Location Sensing Using Wireless Ethernet," 8th International Conference on Mobile Comparing and Networking, 2002.

Bahl, Paramvir, et al. "An In-Building RF-Based User Location and Tracking System," IEEE Infocom, 2000.

* cited by examiner

SYSTEM AND METHODS FOR DETERMINING THE LOCATION DYNAMICS OF A PORTABLE COMPUTING DEVICE

CROSS-REFERENCE TO RELATED APPLICATIONS

This application is a divisional of U.S. patent application Ser. No. 10/610,190, entitled "SYSTEM AND METHODS FOR DETERMINING THE LOCATION DYNAMICS OF A PORTABLE COMPUTING DEVICE", filed Jun. 30, 2003, which is related to pending U.S. patent application Ser. No. 10/423,093 entitled "CALIBRATION OF A DEVICE LOCATION MEASUREMENT SYSTEM THAT UTILIZES WIRELESS SIGNAL STRENGTHS", filed Apr. 25, 2003. This application is also related to co-filed, copending applications MS303523.07/MSFTP456USA and MS303523.09/MSFTP456USC. The entireties of these applications are incorporated herein by reference.

TECHNICAL FIELD

This invention relates to equipment location systems, and more specifically, to a probabilistic location system that determines device location and motion using wireless signal strengths.

BACKGROUND OF THE INVENTION

The increasing ubiquity of wireless network access has motivated the creation of several methods aimed at identifying the location of a wireless client based on radio signal strength measurements. Although these location-based systems continue to improve in terms of accuracy and ease of use, prior efforts have not yet considered the use of the ambient wireless infrastructure to identify in a direct manner the dynamics of the client, such as its motion and velocity. The same signals used for inferring location can be used for inferring dynamics. The information about dynamics, in turn, are useful for helping to infer both the client location and context, in general. Direct access to knowledge about the motion of a client has implications for the best way to fuse a series of signals received over time. For instance, knowledge that a client is motionless would let a location algorithm fuse a set of estimates for the current location into a single estimate with higher certainty. Knowledge of whether a mobile device (and user associated with a mobile client) is in motion may be useful, for example, to provide a signal about if and how to alert a user with an important message. It may be preferred to withhold messages until a user has arrived at a location, or only to let the most important messages through when a user is moving. In another example, it may be preferred to compress a message through summarization or truncation when a user is moving, or raise the volume of an alerting modality, or increase the size of the text of a display.

Location information may be employed to find people, places, and objects of interest. Beyond providing access to the current status of people and items, location information can support presence-forecasting services, which services provide information about a user's future presence or availability. In other applications, location is also useful for identifying the best way to relay notifications to a user, given device availabilities and the cost of interruption associated with different contexts. Location information may also be harnessed for the task of marshalling a set of nearby devices or device components.

Outdoor applications can rely on decoding timing signals from GPS (Global Positioning Service) or GLONASS (Global Navigation Satellite System) satellite navigation systems to obtain high-confidence location information. Unfortunately, no comparably ubiquitous means of measuring location is available for indoor applications. Although specialized systems such as active badges or radio frequency identification (RFID) tags can work well indoors, their installation costs may be prohibitive—and they require users to carry an extra device.

A promising alternative to relying on such specialized location systems is to infer location by accessing signals generated by an existing IEEE 802.11 wireless infrastructure (hereinafter also denoted as "Wi-Fi") of the building. Wi-Fi installations have been diffusing quickly into private and public spaces. In parallel, increasing numbers of mobile devices equipped with IEEE 802.11 network interface hardware or built-in Wi-Fi sensing are becoming available. As the Wi-Fi infrastructure becomes more ubiquitous, location techniques exploiting the ambient radio signals can grow with it, despite the fact that Wi-Fi was never intended for inferring location.

Developing methods for accessing device information from an existing IEEE 802.11 Wi-Fi networking infrastructure is attractive as the use of ambient signals and receivers bypasses the need for special broadcasting and sensing hardware. Prior efforts on ascertaining location from IEEE 802.11 wireless signals have relied on the construction of detailed models of transmission and burdensome calibration efforts, aimed at mapping signals to locations.

The capability to identify the location of wireless clients indoors by measuring signal strengths from multiple IEEE 802.11 access points is not new. Matching signal strength signatures is the same basic technique used by all location-from-802.11 techniques, including a first one, called RADAR. Using a manually calibrated table of signal strengths, the RADAR nearest-neighbor algorithm gave a median spatial error of approximately 2.94 meters. In follow-on work, this error was reduced to approximately 2.37 meters using a Viterbi-like algorithm. Further research also precomputed signal strength signatures using a model of radio propagation and a floor plan of the building. This reduced the calibration effort at the expense of increasing their median location error to 4.3 meters.

Another conventional system, and perhaps the most accurate IEEE 802.11 location system, used Bayesian reasoning and a hidden Markov model (HMM). This system took into account not only signal strengths, but also the probability of seeing an access point from a given location. Like other work, it was based on a manual calibration. The system explicitly modeled orientation and achieved a median spatial error of about one meter using calibration samples taken approximately every 1.5 meters (five feet) in hallways. Many additional conventional systems have been employed using, for example, signal-to-noise ratios instead of the more commonly used raw signal strengths, and a formula that was used for approximating the distance to an access point as a function of signal strength.

Wi-Fi-centric systems have several attractive features, including privacy of location information. All location computations can be performed on the client device, and the device does not need to reveal the identity of the user or other information to the wireless interfaces to the wired network. The combination of growing ubiquity of Wi-Fi infrastructure, existing capable client devices, and privacy solutions make IEEE 802.11 a compelling way to identify location.

However, what is still needed is a Wi-Fi location-based system that requires less training time while providing additional information related to location dynamics.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture for determining the state of motion and location of a portable computing device by analyzing the strengths of wireless signals in a wireless network. Having information about moving versus not moving and more accurate location information is useful for a variety of applications, including for systems that make decisions about the best time and device for alerting a user. The invention facilitates tracking of individuals and/or components, as well as providing relevant information (e.g., based on state, as well as inferred future state) to a user in a wireless network. The invention also facilitates optimizing communications, e.g., maintaining communications and data throughput.

More specifically, the present invention introduces a coherent probabilistic interpretation of signal strengths and visible access points, and employs an HMM representation. However, the present invention is distinct in its use of more sophisticated models than conventional systems for providing estimates of state transition probabilities, which leads to reduced calibration effort. The novel system works from a connected graph of discrete (x, y) high-density location nodes on the floor of the building. Upon the receipt of a set of signal strengths, the HMM is used to compute the probability that the device is at each of the location nodes. At each point in time, each pair of location nodes has a transition probability associated therewith that gives the probability that the device will move from the first member of the pair to the second. These transition probabilities are a function of elapsed time since the last signal strength reading, the distance between the pair of nodes, and the probability that the device is currently in motion. Rather than considering the distance between a pair of nodes to be the Euclidian distance, the shortest path distance is based on a constraint-sensitive path-planning algorithm that takes into consideration the walls of a building floor plan such that paths cannot pass through walls.

The invention includes probabilistic methods for enhancing robustness and reducing the training (or calibration) effort associated with location services based on ambient IEEE 802.11 infrastructures. The disclosed architecture employs a probabilistic graph where locations are nodes and transition probabilities among nodes are derived as a function of the building (or floor plan) layout, expected walking speeds of pedestrians, and an independent inference of whether or not a device is in motion. Calibration of signal strengths is relatively easy compared to other systems of this type. The present invention provides a relatively accurate location sensing system while minimizing calibration effort by including interpolation of signal strengths from a sparsely sampled set of calibration nodes, exploiting path constraints imposed by the building's interior structure (e.g., walls and doors), integrating the consideration of human pedestrian speeds, making independent inferences about whether or not a client device is in motion, and folding in these inferences into the location analysis. Thus the mobile client is as smart as possible in order to maintain accuracy in spite of sparse calibration data, which can be tedious to obtain. Overall, the present invention provides a principled framework representing a superior tradeoff between accuracy and calibration effort by including path, time, and rate constraints that are important for extracting valuable data out of the typically noisy raw signal data.

The disclosed system facilitates visiting a much sparser set of location nodes for calibration then conventional systems. Interpolation is employed to estimate observation probabilities at the high-density location nodes from the lower density calibration nodes. This significantly reduces the necessary calibration effort. The graph of location nodes, transition probabilities, and observation probabilities are combined with a Viterbi algorithm to compute a probability distribution over the high-density nodes from every set of observed signal strengths obtained during live operation of the system. The expected value of device location is reported as an ultimate result, showing that the median error is approximately 1.53 meters.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
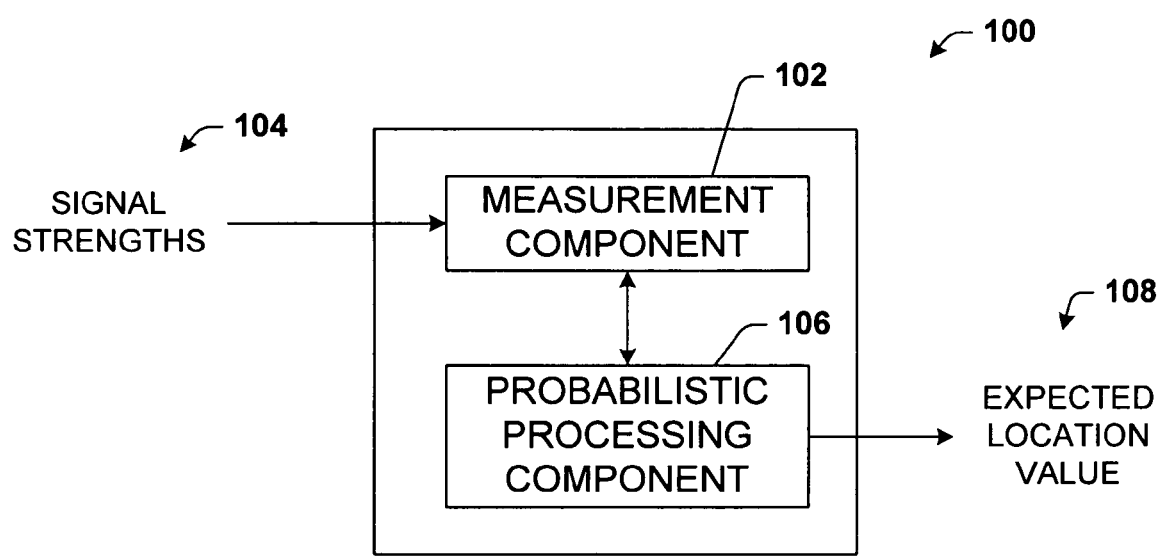
FIG. 1 illustrates a block diagram of a system for facilitating determination of location dynamics of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of a system 100 for facilitating determination of the location and instantaneous dynamics of the present invention. A measurement component 102 receives as one input signal strengths 104 derived from wireless signals associated with multiple wireless network interfaces, also called access points (APs). Note that the measurement component 102 may also be configured to receive the raw signals, and then process these raw signals to obtain the signal strength data thereof. In any case, the signal strength data 104 is processed and utilized by a probabilistic processing component 106 to ultimately report as an output an expected value 108 that a portable device is at a location as well as a probability that it is currently in motion.

As is described in greater detail hereinbelow, the probabilistic processing component 106 employs a probabilistic graph where locations are represented as location nodes, and transition probabilities among the location nodes are derived as a function of the building (or floor plan) layout, expected walking speeds of pedestrians, and an independent inference of whether or not a device is in motion.

The probabilistic component 106 uses more sophisticated models than conventional systems for providing estimates of state transition probabilities, which leads to a reduction in calibration effort. More specifically, the system 100 provides a probabilistic interpretation of signal strengths and visible access points, and employs a hidden Markov model (HMM) representation. Upon the receipt of a set of the signal strengths 104, the HMM is used to compute the probability that the portable device is at each of the location nodes. At each point in time, each pair of nodes has a transition probability associated therewith that gives the probability that the device will move from the first member of the pair to the second. These transition probabilities are a function of elapsed time since the last signal strength reading, the distance between the pair of nodes, and the probability that the device is currently in motion. Rather than considering the distance between a pair of nodes to be the Euclidian distance, the shortest path distance is based on a constraint-sensitive path-planning algorithm that takes into consideration the walls of a building floor plan such that paths cannot pass through walls.

The system 100 provides a relatively accurate location sensing system while minimizing calibration effort by including interpolation of signal strengths from a sparsely sampled set, exploiting path constraints imposed by a building's interior structure (e.g., walls and doors), integrating a consideration of human pedestrian speeds, making independent inferences about whether or not a client device is in motion, and folding in these inferences into the location analysis. Thus the mobile client is as smart as possible in order to maintain accuracy in spite of sparse calibration data, which can be tedious to obtain. Overall, the present invention provides a principled framework representing a superior tradeoff between accuracy and calibration effort by including path, time, and rate constraints that are important for extracting valuable data out of the typically noisy raw signal data.

The probability component 106 significantly reduces calibration effort by employing regression by interpolating to estimate observation probabilities at the high-density location nodes from the lower density calibration nodes. The graph of location nodes, transition probabilities, and observation probabilities are combined with the Viterbi algorithm to compute a probability distribution over the location nodes from every set of observed signal strengths. The expected value of location is reported as an ultimate result, showing that the median error is approximately 1.53 meters.

The likely speed of the portable device is considered explicitly, by inferring the likelihood that a device is moving. A model for inferring motion in described in greater detail hereinbelow. The speed of the portable device is computed as the expected velocity, based on a consideration of the probability distribution of human pedestrian speeds and on an inference of whether or not the device is moving.

The graph of location nodes, transition probabilities, and observation probabilities are combined with the Viterbi algorithm to compute a probability distribution over the location nodes from every set of observed signal strengths. The present invention reports the expected value of location as its ultimate result.

Figure 2:
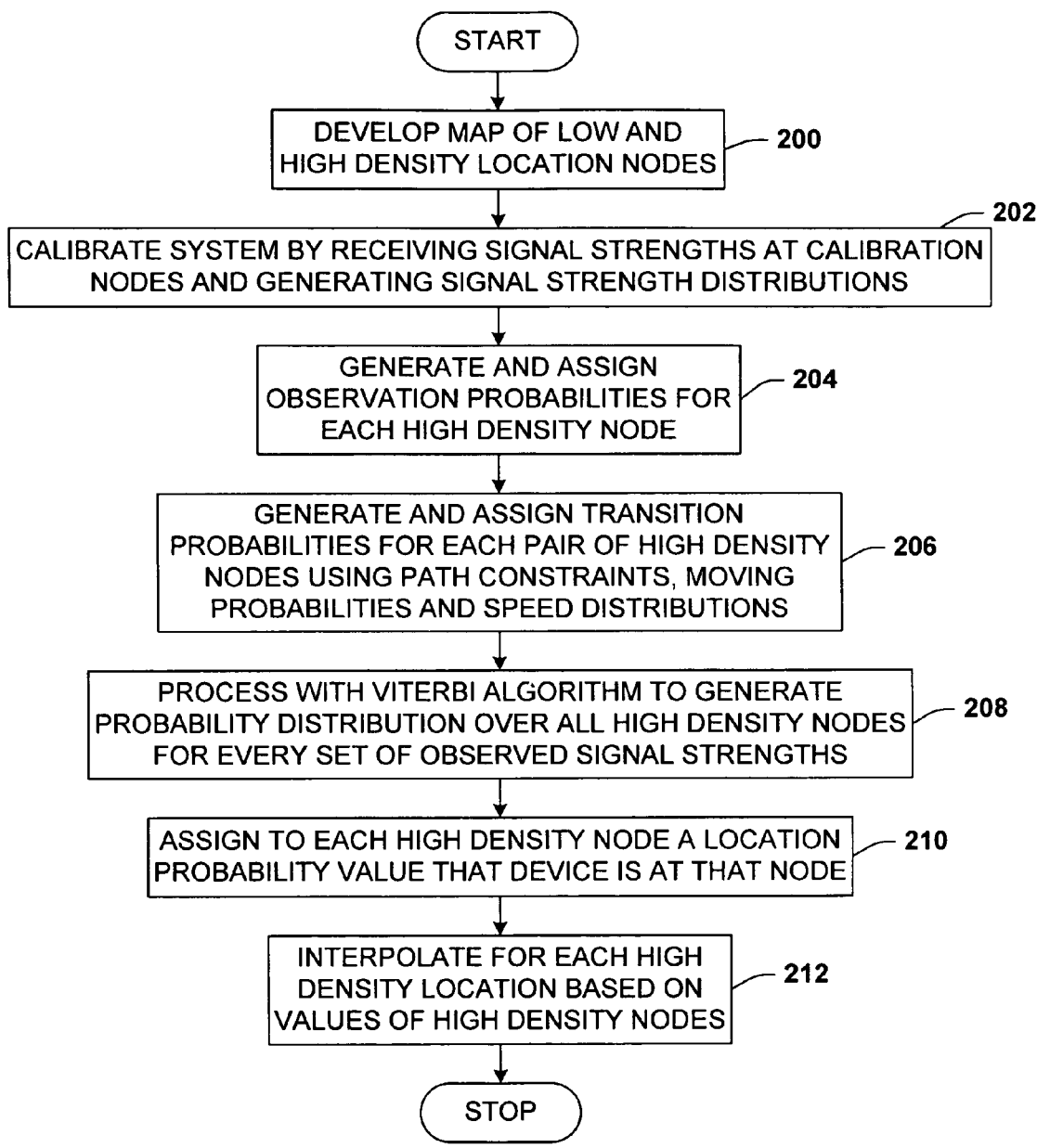
FIG. 2 illustrates a flow chart of processes of the probability component of the present invention.

Referring now to FIG. 2, there is illustrated a flow chart of processes of the probability component of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The disclosed architecture uses IEEE 802.11 signal strengths to estimate the location and infer motion of a portable device. The signals come from statically placed IEEE 802.11 access points that provide a wireless link between mobile devices and a wired network.

Note that the novel architecture is not restricted to using access points, since other types of wireless RF transmitters may be employed in lieu of or in combination with the access points. For example, in an asset management location system, a Real Time Locating System (RTLS) may utilize the benefits of the disclosed invention. A RTLS is fully automated system that continually monitors the location of assets and/or personnel, and typically utilizes battery-operated radio tags and a cellular locating system to detect the presence and location of the tags. The locating system is usually deployed as a matrix of locating devices that are installed at a spacing of anywhere from fifty to one thousand feet. These locating devices determine the locations of the radio tags, which tags may be placed on any item or person. Thus the signal strengths are received from RF transmitters that activate the transponder tags to determine where the item is located, or the location and/or movement of the person. In this respect, the RTLS system may be calibrated and analyzed in the same way.

Initially, a floor plan of the area to be calibrated is used to develop low-density nodes, which are a set of nodes that define a sparse network of locations in the floor plan that approximate walking paths typically used by the user of a portable device. Utilizing the floor plan facilitates selecting the nodes used in interpolation process. The low-density nodes are the endpoints of straight-line segments of the network, and are a subset of the total number of nodes that will eventually be used to infer the device motion and location. Once the low-density nodes are developed, high-density nodes are interspersed automatically by the computer in the floor plan of low-density nodes according to user-defined spatial criteria.

Measuring the signal strengths at various locations of the floor plan is the calibration process that yields a number of probability distribution functions at every high-density node, where each probability distribution function gives the probability of "seeing" a given signal strength from a given access point, at that high-density node. The probability distributions of a given high-density node are called the observation probabilities for that node. Since it would be impractical to visit each location of the floor plan and record signal strengths, a much sparser set of location nodes is visited for calibration. Interpolation is then employed to estimate observation probabilities at the high-density nodes from the calibration nodes. This significantly reduces the necessary calibration effort.

Thus, at 200, a computer generated and processable map of the floor plan is developed for establishing thereon both the low and high-density location nodes. Although combined at 200, the low-density nodes are developed first by manual entry, followed by automatic population of the floor plan with the high-density nodes interspersed among the low-density nodes. At 202, the system is then trained by a calibration process that measures and records signal strengths at each of a set of calibration nodes. The location of the calibration nodes is not necessarily chosen to be the same as that of the low-density and/or high-density node locations, although this may occur incidentally. The calibration process facilitates the derivation of signal strength distributions for each calibration node. At 204, observation probabilities are generated and assigned to each high-density node based on the observed signal strengths at a calibration node.

At 206, transition probabilities are generated and assigned for each pair of high-density nodes using path constraint information, moving/still probabilities information, and speed distribution data between each pair of high-density nodes. At 208, a Viterbi algorithm is used to combine elements of the HMM to produce a set of probabilities for all high-density nodes for all observed signal strengths. Other algorithms may also be used. Each high-density node is then assigned a location probability value that the portable device is at that node, as indicated at 210. Interpolation is used based upon the high-density data to determine the likelihood that the device is at or near a high-density node, as indicated at 212. The process then reaches a Stop block.

Figure 3C:
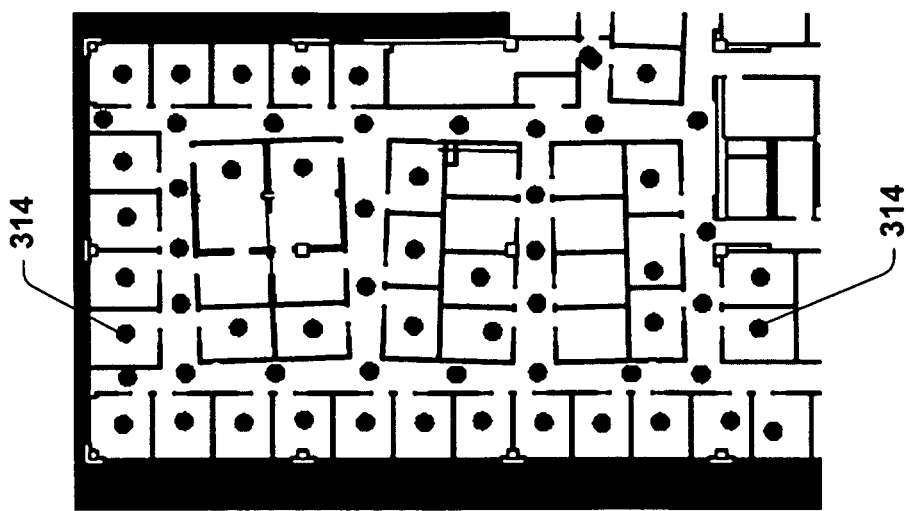
FIG. 3C illustrates a graphical representation of the calibration nodes of the floor plan used to obtain signal strength readings, as provided by the data collection system of the present invention.
Figure 3B:
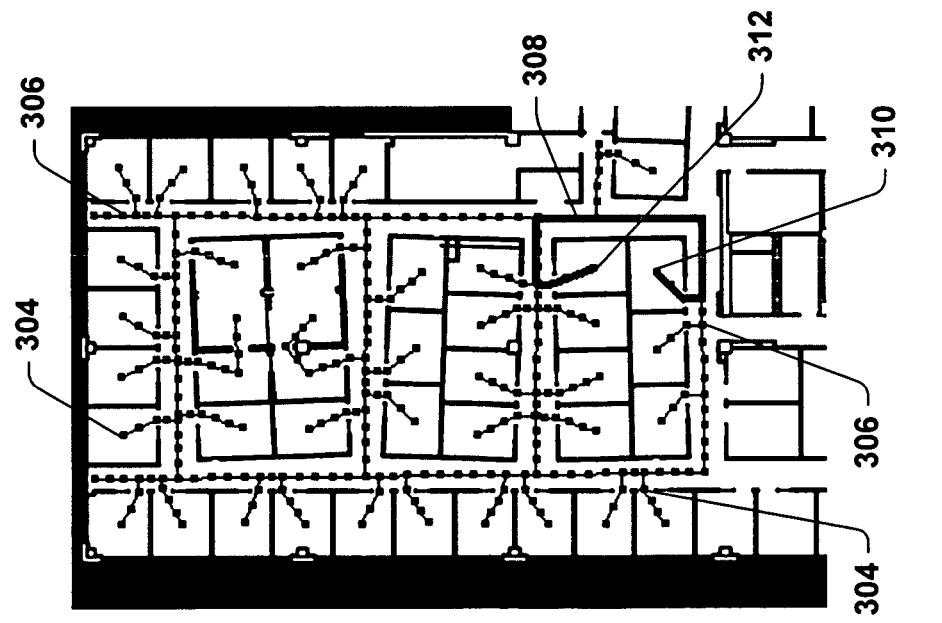
FIG. 3B illustrates a graphical representation of the high-density nodes automatically added to the low-density nodes on the floor plan.
Figure 3A:
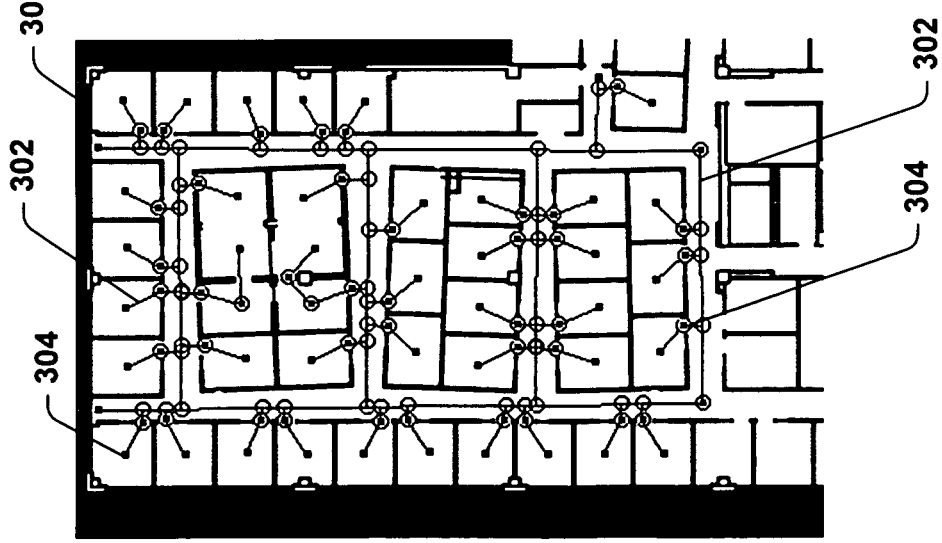
FIG. 3A illustrates a graphical representation of the low-density nodes on the floor plan, as drawn by someone setting up the system.

Referring now to FIG. 3A, there is illustrated a graphical representation of the low-density location nodes on a floor plan 300, as drawn by someone setting up the system. In order to facilitate path constraints imposed by the floor plan structure 300 (e.g., walls and doors), the disclosed location system provides a graphical representation of discrete location nodes. Initially, as shown in FIG. 3A, the user utilizes the floor plan 300 of the area that will be calibrated to manually draw lines that represent the likely walking paths 302 between all locations of the area to be calibrated. This introduces a network of low-density nodes 304 (that includes endpoint nodes and intermediate straight-line segments endpoints nodes) into the floor plan 300.

FIG. 3B illustrates a graphical representation of the floor plan that includes the high-density nodes automatically interspersed among the low-density nodes. A data collection algorithm automatically calculates and distributes the set of high-density nodes among the set of low-density location nodes according to spatial criteria input by the user. Thus FIG. 3B shows the total set of discrete nodes mapped onto the floor plan 300, which includes all of the low-density location nodes used for inferring device location at the high-density nodes. A heavy line 308 shows the shortest path between two location nodes (310 and 312). Edge weights (i.e., the connections between the nodes) are defined as the distances between any two adjacent nodes. FIG. 3C illustrates a graphical representation of the floor plan calibration node locations 314 for measuring signal strength readings.

Once all data is processed through a Viterbi algorithm, the result is a number attached to each location node (304 and 306) giving the probability that the device is at or near that location.

Figure 4:
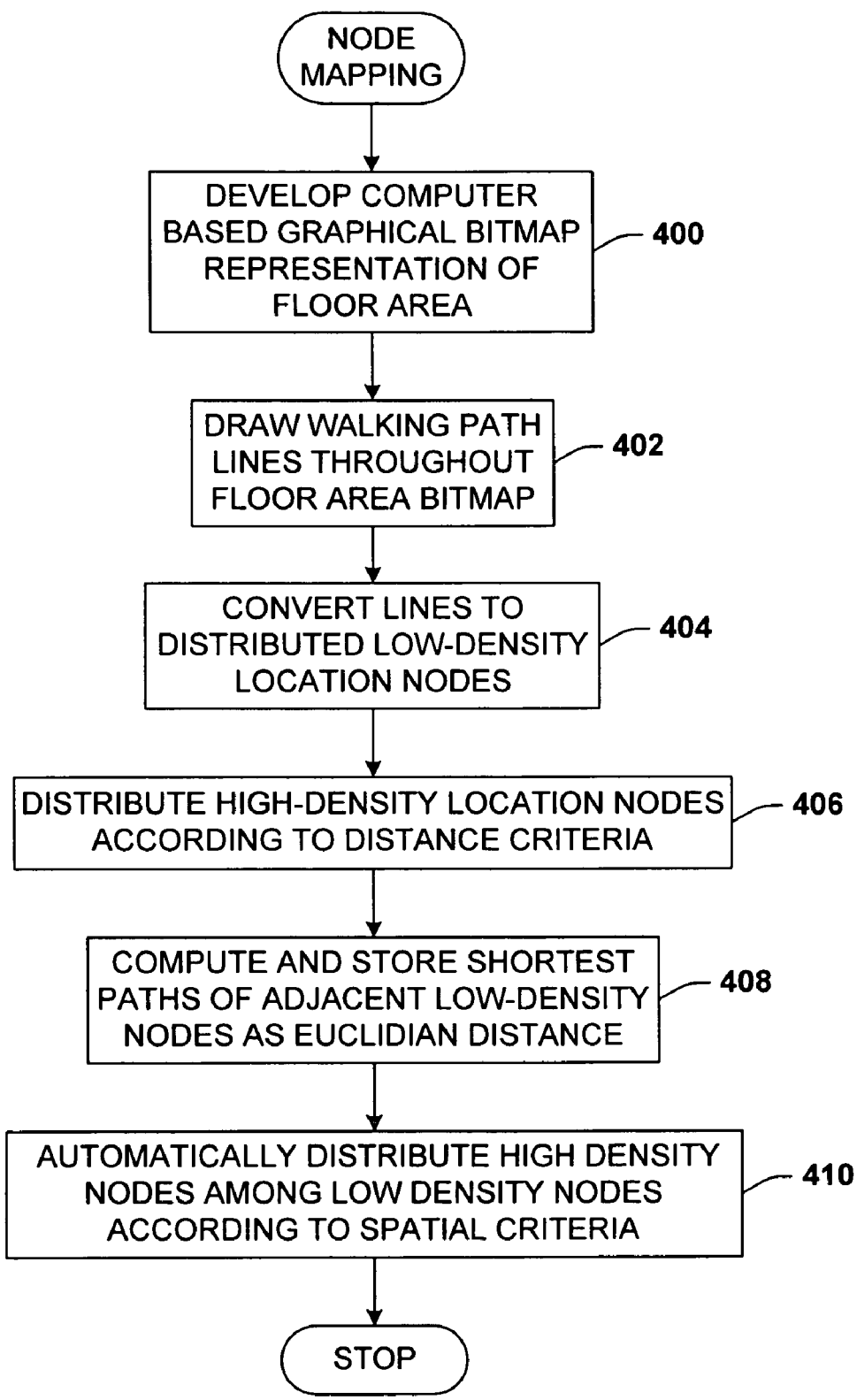
FIG. 4 illustrates a flow chart of the process for establishing low-density and high-density nodes for use by computer drawing or mapping program of the disclosed architecture.

Referring now to FIG. 4, there is illustrated a flow chart of the process for establishing low-density and high-density nodes for use by computer drawing or mapping program of the disclosed architecture. At 400, a computer-based graphical bitmap representation is generated of the floor plan to be calibrated. A drawing program is provided that displays as the background a bitmap of a building floor plan. The bitmap for the floor plan may be obtained from an electronic database of floor plans or from a scanned blueprint. The transformation between pixels and floor coordinates is computed with a simple least squares fit solution for the transformation matrix based on corresponding points in the bitmap and on the actual floor plan.

At 402, to place the low-density nodes, a set of human path lines or tracks that approximate walkways that might be taken is manually drawn via the mapping program interface throughout the floor plan, as shown previously in FIG. 3A. These tracks represent the feasible walking paths of a user and a portable device that may be followed as the user moves throughout the floor plan area. The drawing program allows a user to draw straight lines on the floor plan whose end points can be anchored to a certain location or hinged anywhere on a previously drawn line. The program also provides simple editing controls for moving lines and end points. Once all the path lines have been drawn, the program converts the lines to the low-density nodes by processing each path straight-line endpoint as a location node, as indicated at 404.

At 406, the mapping program automatically distributes high-density nodes among the low-density nodes throughout the floor plan bitmap, according to spatial criteria provided by the user. For example, where the spacing is one meter, a total of 317 low-density and high-density nodes are generated for this floor plan, as illustrated in FIG. 3B.

The high-density nodes represent a graph that is a fully connected, bi-directional graph so that every node connects to every other node. At 408, the shortest paths to adjacent high-density nodes are computed as the Euclidean distance and stored. The edges shown in FIG. 3B are only the edges between adjacent nodes, and the edge weights are the Euclidian distance between the nodes. At 410, the shortest path through non-adjacent high-density nodes is computed according to a shortest-path algorithm and stored. The shortest paths are computed using a shortest path algorithm by noted scientist Edsger W. Dijkstra. For non-adjacent nodes, the edge weight is the shortest path distance through a sequence of adjacent nodes. All the distances are stored for later use by the HMM.

The shortest path distances embody the path constraints imposed by the floor plan structure. For instance, FIG. 3B illustrates with the thick line 312 the shortest path connecting the approximate centers of two offices. This is the shortest path between the two endpoints (310 and 312), and it encapsulates the fact that to get between these two points, a device would have to travel at least as long as the shortest path, as opposed to the direct Euclidian distance, which is much shorter. Formally, the distance between nodes i and j is called $d_{ij}$. These distances are used later to compute realistic transition probabilities between all nodes in the graph. The transition probabilities are described in greater detail hereinbelow.

The discrete nature of the nodes causes a slight problem in that the device to be located is likely not precisely at any of the predefined low-density or high-density nodes. This challenge is mitigated by the fact that the nodes are fairly close together (no more than one meter separates adjacent nodes), and that in the end a continuous position estimate is computed based on the expected value of the discrete probability distribution over all the node coordinates. However, for a variety of potential location-specific applications, this resolution is usually enough.

In computing the location probabilities, the Viterbi algorithm used for the HMM seeks the best position by optimizing over all possible paths through the nodes with respect to the history of measured signal strengths. Another way to achieve this respect for past measurements is via the use of a Kalman filter, which has the advantage of being continuous. However, the Kalman filter neither allows the sort of path constraints imposed herein nor the capability of representing multimodal probability distributions over location, as the more general HMM formulation does. Another alternative to the HMM formulation is a particle filter, which has been used for robot localization. A particle filter could embody the same sort of path constraints, but carries the risk of being more expensive to compute.

Determining Motion of the Portable Device

As indicated previously, location inferences consider inferences about the state of motion of a device. That is, in order to utilize transition probabilities between pairs of high-density nodes, movement or lack thereof by the portable device must be considered. Thus the likelihood that a device is moving or at rest needs to be determined. The discrimination of a device in motion versus at rest is challenging a priori as IEEE 802.11 signals from multiple APs change in strength chaotically, even when a system is at rest due to multiple factors, including people walking in regions between multiple APs and devices. Even in light of such "twinkling" of the signal from different APs at rest, the methods described herein provide valuable inferences about whether a device is moving versus still by examining the nature and degree of the flickering of signals from different APs over a short time window. The core notion behind the method is that a statistical analysis can exploit the greater variation of signal strengths from APs when a device is in motion than when it is still; signal strengths typically appear to vary differently when the device is in motion than when it is still.

Figure 6:
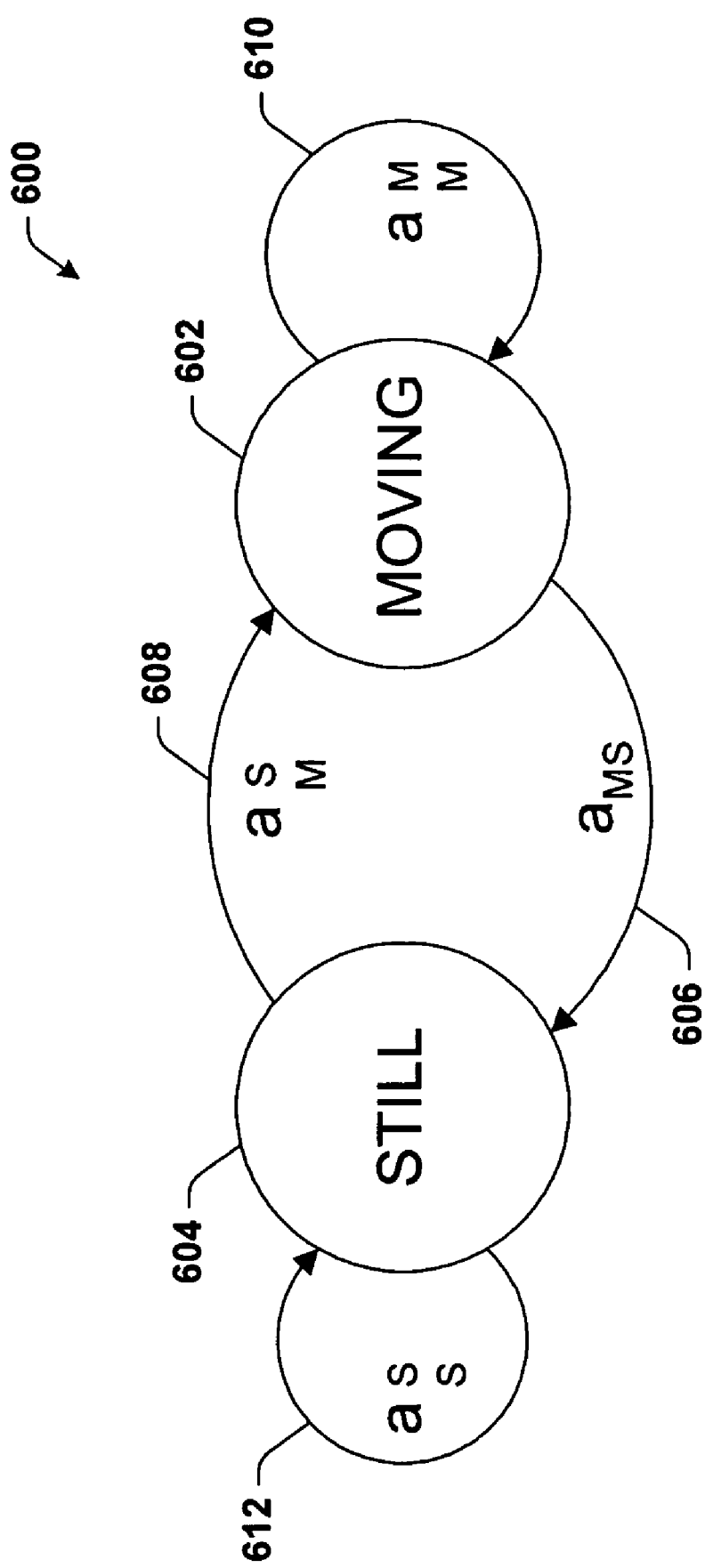
FIG. 6 illustrates a state diagram of a 2-state Markov model used for determining the dynamic state of a device.

Referring now to FIG. 6, there is illustrated a state diagram of a 2-state Markov model 600 used for determining the dynamic state of a device. As shown, the model 600 includes the moving state 602 and still state 604. A transition 606 from moving to still is defined by $a_{MS}$, and the transition 608 from still to moving is defined by $a_{SM}$. When the device remains in a moving state, this is represented by the loopback path 610, defined as $\alpha_{MM}$. Similarly, when the device remains motionless, this is represented by the loopback path 612, defined as $\alpha_{SS}$. Note that the HMM for the dynamic state of the device (moving vs. still) is different from the HMM for the location of the device.

Unsmoothed state Probabilities

Figure 5:
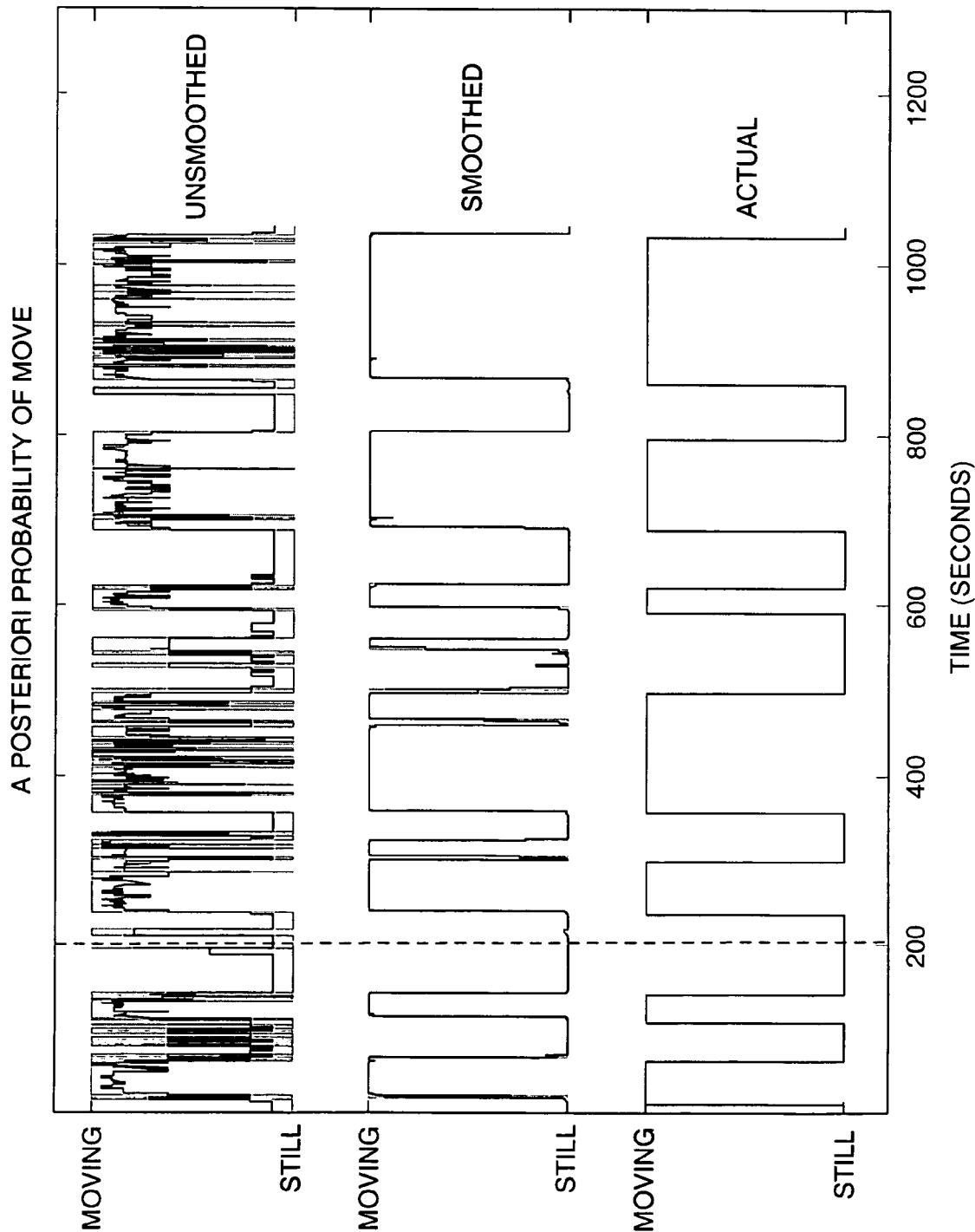
FIG. 5A illustrates a plot of the raw unsmoothed a posteriori probabilities of whether or not a device is moving over time.
FIG. 5B illustrates a plot of the smoothed a posteriori probabilities of whether or not a device is moving over time.
FIG. 5C illustrates a plot of the actual state of motion of the device associated with FIGS. 5A and 5B.

Referring now to FIG. 5A, there is illustrated a plot of the unsmoothed a posteriori probability of a device moving over time. These probabilities are computed based on a feature that captures the variation of the signal strength over time. That is, at any given time, the access point with the strongest signal is sensed, and then the variance of that access point's signal over a short interval ending at the given time is computed. The portable computer measuring system utilizes a data collection program that is trained by collecting a set of labeled signal strengths by alternately walking around measuring signal strengths, and then stopping within an office. This process is performed over a thirty-minute period while recording the signal strengths. The data collection program also records whether or not the wirelessly connected laptop was moving. The variances are computed with a 20-sample window, which translates to approximately sixty-three readings per access point at a sampling rate of 3.16 Hz.

Figure 7:
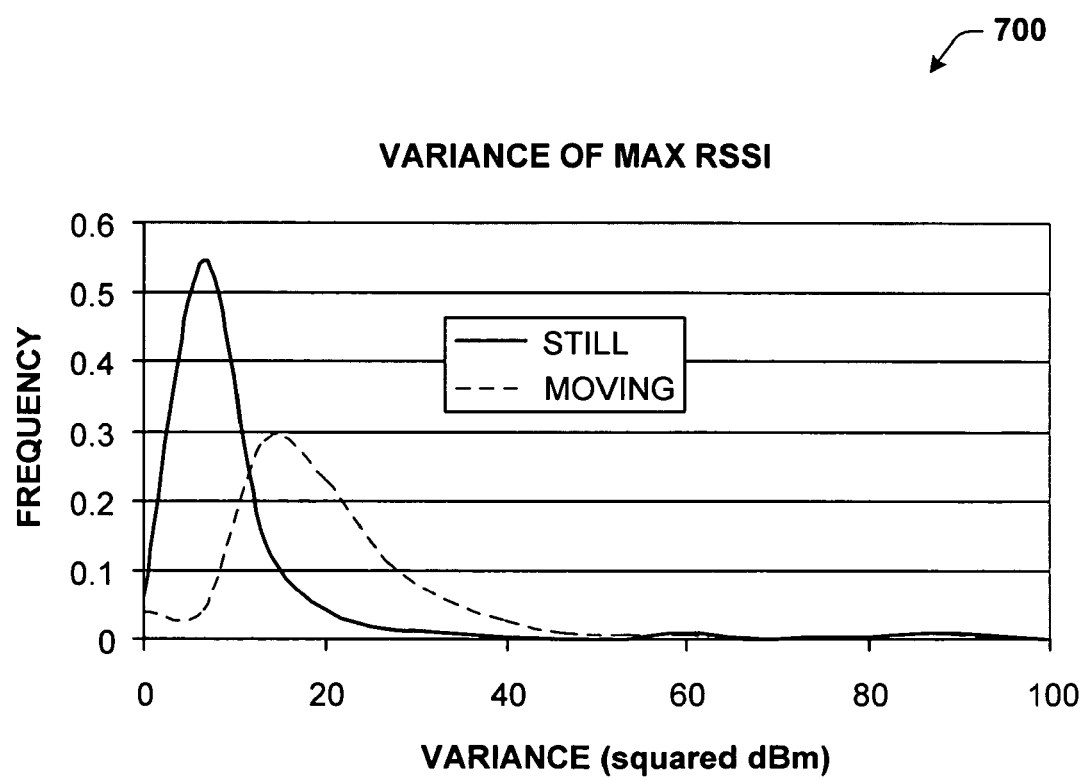
FIG. 7 illustrates a plot of histograms of the variances for the still and moving cases.

Referring now to FIG. 7, there is illustrated a plot 700 of histograms of the variances for the still and moving cases, as described hereinabove. Using $\sigma_{max}^2$ to represent the windowed variance of the current maximum signal strength, the histograms are used to represent the conditional probability distributions $p(\sigma_{max}^2|still)$ and $p(\sigma_{max}^2|moving)$. Given a value of $\sigma_{max}^2$, estimations are made for the probability of moving, $p(moving|\sigma_{max}^2)$, and the probability of being still, $p(still|\sigma_{max}^2)=1-p(moving|\sigma_{max}^2)$. Using a Bayes rule classifier, it can be said that the posterior probability of the client moving is, $$p(moving|\sigma_{max}^2) = \frac{p(\sigma_{max}^2|moving)p(moving)}{p(\sigma_{max}^2|moving)p(moving) + p(\sigma_{max}^2|still)p(still)} \quad (1)$$

Here, p(still) and p(moving) are the a priori probabilities of the dynamic state of the device. In lieu of any other information about the priors, both are set to 0.5.

Using the histograms on the set of 3200 test readings taken several days after the training data, classification into categories as to whether the device was "still" or "moving" was made correctly in approximately 85% of the data. The posterior probabilities over time computed this way are illustrated in FIG. 5A.

Note that instead of using the Bayes rule classifier, the subject invention can employ various statistical analyses for carrying out various aspects of the subject invention. For example, a process for determining which destination is to be selected for the synchronization process can be facilitated via an automatic classification system and process. Such classification can employ a probabilistic and/or statistical-based analysis (e.g., factoring into the analysis utilities and costs) to prognose or infer an action that a user desires to be automatically performed. For example, a Bayesian network model or support vector machine (SVM) classifier can be employed. Another classification approach includes decision trees. Classification as used herein also is inclusive of statistical regression that is utilized to develop models of priority. Such models can consider multiple observations beyond overall variance, including details of the structure of the distribution over signals from multiple APs, such as considerations of the relationship between the largest signal and others, different modes of distributions over signals over time, and notions of relative strengths.

Smoothed State Probabilities

Referring now to FIG. 5B, there is illustrated a plot of the smoothed a posteriori probabilities of a device the moving over time. A plot of the unsmoothed probability of moving, $p(moving|\sigma_{max}^2)$ as a function of time for the 3200 test points is shown in FIG. 5A. It is clear that the unsmoothed a posteriori probability jumps from high to low too often given the process that is being modeled. It is known that people and their devices do not transition from still to moving this often, so it is desirable to smooth the a posteriori probabilities by imposing explicit transition probabilities governing the still and moving states. FIG. 5C illustrates the actual data for the smoothed and unsmoothed probability plots of FIGS. 5A and 5B.

Instead of simply trying to estimate the probability of a state $q_T$ at time T from a single feature $\sigma_{max,T}^2$ at that time, the most likely sequence of states $Q=q_1,q_2,\ldots,q_T$ is found from a sequence of observations $O=\sigma_{max,1}^2, \sigma_{max,2}^2, \ldots, \sigma_{max,T}^2$. In this case, there are only two possible states, i.e., still and moving, thus $q_t \in \{S,M\}$. For simplicity, a first order Markov assumption is used to govern the transition between states, which means that the probability of the current state is independent of all but the most recent state, so that $P(q_{t+1}=j|q_t=i)=a_{ij}$, where $a_{ij}$ is a transition probability and i, $j \in \{S,M\}$.

The transition probabilities can be estimated from the assumptions about human behavior. It is proposed that a person will make m moves over a period of s seconds. If the signal strength sampling rate is r, there will be s/r total samples in the time period. The probability of a move occurring on one of these samples is then mr/s. If each still-to-move transition (SM) is assumed to eventually be accompanied by a move-to-still (MS) transition then, $a_{SM}=a_{MS}=\min(mr/s,1)$ $a_{SS}=1-a_{SM}$ $a_{MM}=1-a_{MS} \quad (2)$ The min( ) function keeps the transition probability within range. The equations for $a_{SS}$ and $a_{MM}$ come from the constraint that $a_{SS}+a_{SM}=a_{MM}+a_{MS}=1$.

For a typical office worker, it is estimated that ten moves (i.e., m=10) occur in one eight-hour day, giving s=28,800 seconds. At the radio signal strength indicator (RSSI) sampling rate of 3.16 Hz, the values of $a_{SM}$ and $a_{MS}$ are calculated to be the following:

$a_{SM}=a_{MS}=0.0011$ $a_{SS}=a_{MM}=0.9989 \quad (3)$

Another element of the Markov model is the initial probabilities of being in the still or moving states, $\pi_S$ and $\pi_M$, respectively. For lack of any other information, both are set to 0.5.

Because the states cannot be directly observed, the Markov model is actually "hidden". What is observed at each sample time t is $\sigma_{max,t}^2$, which is probabilistically connected to the actual state through $p(\sigma_{max,t}^2|q_t=still)$ and $p(\sigma_{max,t}^2|q_t=move)$.

All the elements necessary for an HMM have now been determined, i.e., states, transition probabilities, initial state probabilities, and observation probabilities. The Viterbi algorithm is used to compute the a posteriori state probabilities $P(q_T=still|O)$ and $P(q_T=moving|O)$ at the current time T. The Viterbi algorithm gives an efficient method of computing the state probabilities based on all the past observations $O=\sigma_{max,1}^2, \sigma_{max,2}^2, \ldots, \sigma_{max,T}^2$. The algorithm is recursive and so does not require the storage of previous observations. Thus, by running it on the observation at T, all the previous observations are implicitly being taken into account. Because of this efficiency, the Viterbi algorithm is re-run on every new observation.

The overall effect of using the HMM is that the transition probabilities tend to make the system more reluctant to change states due to slight or brief changes in the state-conditional probability densities $p(\sigma_{max,t}^2|q_t=still)$ and $p(\sigma_{max,t}^2|q_t=moving)$. However, for some values of $\sigma_{max}^2$, one or both of these densities drop to zero because the histogram bin for that $\sigma_{max}^2$ was never filled during training. If just one of the densities is zero, then the probability of being in that state also drops to zero, even if evidence for the opposite state is weak and even if the probability of transitioning to the opposite state is very low. To help smooth over these occasional state blips due to less-than-complete training data, a standard mathematical hack of adding a slight offset to the state-conditional probabilities is used. In particular, $$p'(\sigma_{max,t}^2|q_t=\text{still})=p(\sigma_{max,t}^2|q_t=\text{still})+\alpha$$

$$p'(\sigma_{max,t}^2|q_t=\text{moving})=p(\sigma_{max,t}^2|q_t=\text{moving})+\alpha \quad (4)$$

Where is alpha is chosen to be $\alpha=0.011$, and $p'(\cdot)$ is used instead of $p(\cdot)$ for the HMM. While this offset violates one of the most fundamental characteristics of probability densities (that they integrate to one), it does make the smoothing work much better.

Using the transition probabilities computed above and the $\alpha$-offset, a state-conditional density $P(q_T=\text{moving}|O)$ is computed for each sample in the 3200-point test data set. FIG. 5B illustrates the resulting plot. This shows how using transition probabilities and a sense of past state make the state probabilities much less jumpy. The classification error rate drops from approximately 15.5% to 12.6% by using the HMM smoothing. While the gain in classification accuracy is small, the real gain comes in the reduction of falsely reported state transitions. There were fourteen actual transitions in the test set. Unsmoothed classification reports 172 transitions (158 too many), and smoothed classification reports twenty-four transitions (only ten too many). Reducing false transitions is important for both helping to localize a wireless device (an important aspect of the disclosed architecture) and for inferring the context of a user. In terms of context, if the device were judged to be moving, this would likely mean that the person carrying the device is moving between locations and is neither in a meeting nor in an office.

Transition Probabilities for Location

The previous section showed how to calculate the probability that a Wi-Fi device is in motion. This is one of the ingredients in computing the transition probabilities between location nodes, which are ultimately used in an HMM for computing location. Qualitatively, the transition probabilities to nearby nodes are desired to be larger than that to far away nodes. To quantify motion, the shortest path distances described hereinabove are used along with a probability distribution of human pedestrian speeds. For a more accurate speed distribution, the HMM-smoothed estimate of $p(\text{moving}|\sigma_{max}^2)$ is used from the previous description.

Speed Between Nodes

Figure 8:
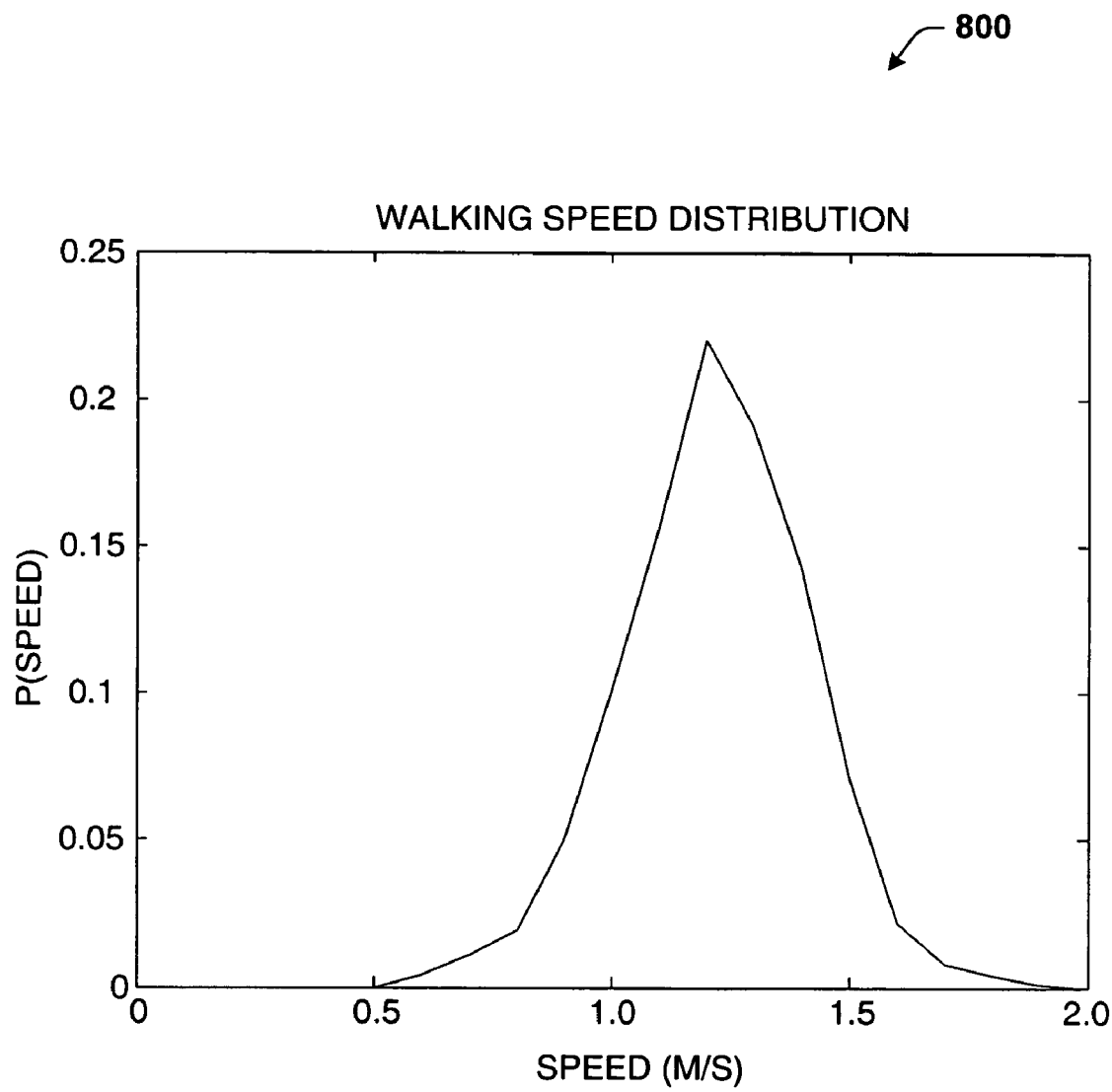
FIG. 8 illustrates a plot of a conventional distribution of human walking speeds used in accordance with the present invention.

A probability distribution of human pedestrian speeds will now be derived. In an office building, people mostly walk to get from place to place. The distribution of walking speeds can be approximated using a plot of FIG. 8 of the distribution of human walking speeds, which may be obtained from conventional studies. This distribution of walking speeds is denoted mathematically herein as P(walking speed|moving). Further, people sometimes shuffle slowly from place to place, and they sometimes sprint. This behavior is modeled with a uniform distribution of speeds ranging from zero to a maximum of approximately 10.22 meters/second (an estimate of the maximum human running speed), and denoted mathematically as P(other speed|moving). It is assumed that when a person is moving, he/she spends a fraction $\omega$ walking and the rest of the time at some other speed. Given a person is moving, his/her speed distribution is then, $$P(s|\text{moving})=\omega P(\text{walking speed}|\text{moving})+(1-\omega)P(\text{other speed}|\text{moving}) \quad (5)$$

Here s represents speed in meters/second, and assume that $\omega$ is 0.9. The unconditional P(s) takes into account the probability that the person is either moving or still, which comes from the dynamic inference from the previous section. Abbreviating these as P(moving) and P(still), P(s) is defined as, $$P(s)=P(s|\text{moving})P(\text{moving})+P(s|\text{still})P(\text{still}), \quad (6)$$

where $P(s|\text{still})=\delta(0)$, because a person's walking speed is zero when still. Here $\delta(x)$ is the Dirac delta function. This gives a probability distribution of human pedestrian speeds based on whether or not it is thought that the person is moving, and if so, the distribution of walking speeds and maximum possible running speed.

Transition Probabilities

The transition probability between two location nodes is proportional to the probability of a human traveling at a speed necessary to traverse the distance between the nodes. If a device has moved from node i to node j, its speed had to be $rd_{ij}$, where r is the RSSI sampling rate (e.g., 3.16 Hz in the disclosed example) and $d_{ij}$ is the shortest path distance between the two nodes, as explained above. The probability of observing this speed is $p_{ij}=P(s=rd_{ij})$. These probabilities must be normalized so that all transition probabilities emanating from a node sum to one. Thus the transition probability is, $$a_{ij} = p_{ij} \bigg/ \sum_{j=1}^{N} p_{ij}, \quad (7)$$

where N=317 is the number of location nodes. These are the transition probabilities used to calculate the most likely path through the nodes. These probabilities encapsulate what is known about the floor plan layout and the speed of the device. Since the $a_{ij}$ are a function of P(moving), which changes over time, the $a_{ij}$ must be recomputed at every time step. The Viterbi algorithm used to calculate the most likely path does not need to store past transition probabilities, so the necessary updates do not translate into increased memory requirements.

Signal Strength Observation Likelihoods

When inferring a location, the device's signal strengths are compared against signal strength probability distributions determined previously during calibration at different location nodes in the building. These previously seen signal strength distributions are estimated based on data from physically carrying the device to a set of known calibration nodes. A straightforward implantation would require visiting all N=317 high-density location nodes for calibration. Since approximately sixty seconds is spent at each calibration point, calibrating at each location node would be prohibitive. Instead, the calibration readings are taken at a much smaller number of locations (sixty-three in this example), and used to interpolate at the high-density location nodes. This means calibration occurred at about 20% of the number of points used in the graph of high-density location nodes.

Gathering Signal Strength Distributions

Following is a description of how signal strengths are gathered according to the floor plan and how the signal strength probability distributions are interpolated to all high-density location nodes.

Figure 9:
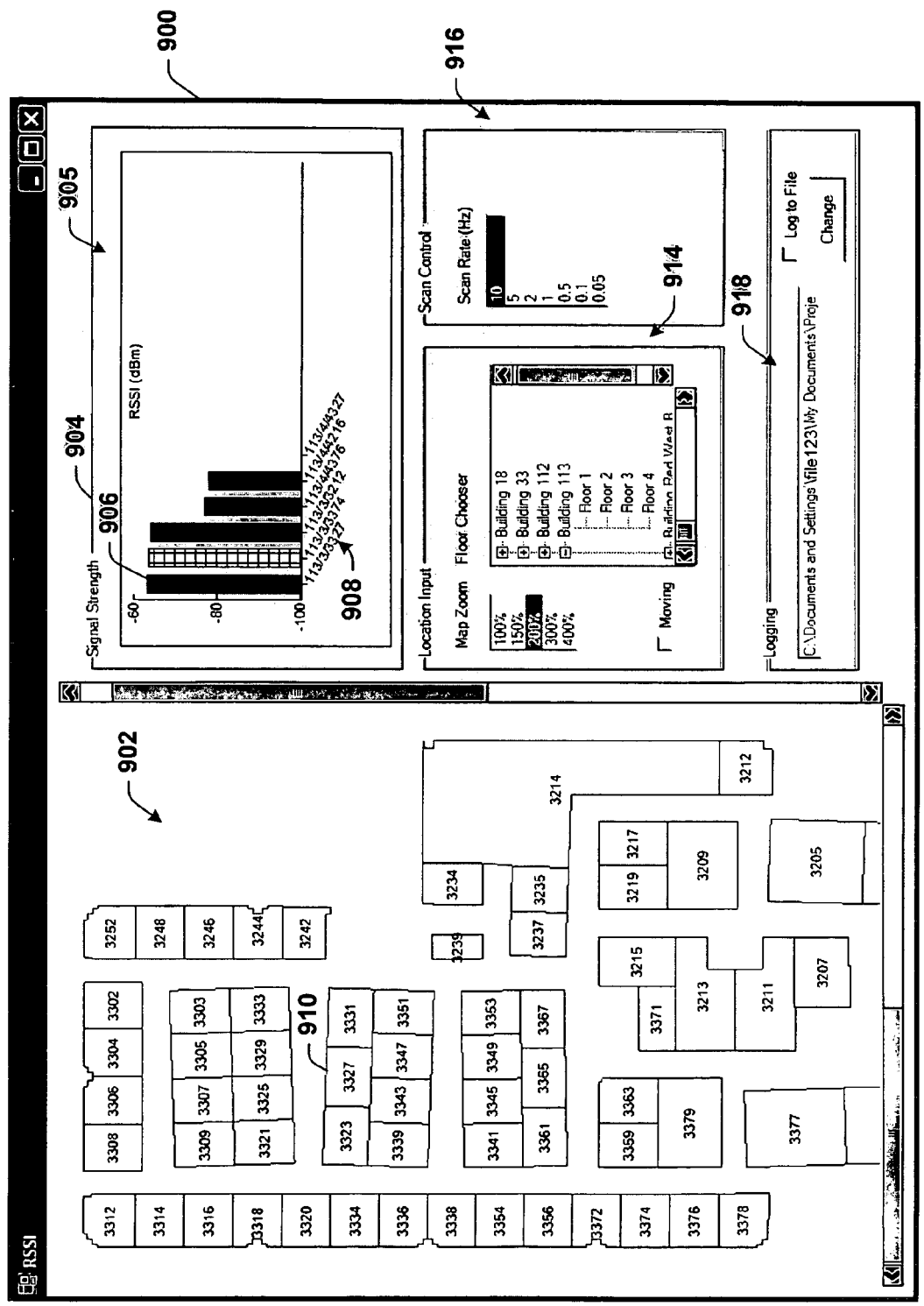
FIG. 9 illustrates a screenshot of a graphical user interface of the data collection program for facilitating signal strength logging of the calibration data.

Referring now to FIG. 9, there is illustrated a screenshot of a graphical user interface (GUI) 900 of the data collection program for facilitating signal strength logging of the calibration data. The GUI 900 facilitates the display of a graphical representation 902 of the floor plan of FIG. 3A, and rooms thereof. The user indicates the location of the portable receiving device by selecting an (x,y) location from the floor representation 902 via a mouse, keyboard, or other conventional input device. Additionally, there is presented a signal strength subwindow 904 for presenting a signal strength indicator plot 905 that displays a representation of the measured signal strengths from nearby transmitters. For example, a first bar 906 includes a first color or fill pattern that indicates the signal was received from a transmitter on the current floor being calibrated. Associated with the bar 906 is data 908 that indicates the signal strength data, the floor on which the room is located, and the room number of the transmitter (i.e., 113/3/3327). In this particular example, the transmitter was in building number (113), room number 3327 (also denoted graphically at 910) of the third floor (3).

A second bar identification 912 may be used to indicate measurements received from transmitters on floors other than the current floor being calibrated. The bar 912 is associated with room 113/4/4327, which is a room 4327 on the fourth floor of building 113. It is to be appreciated that the GUI can be programmed to provide a wide variety of graphical responses to measure signals, including flashing bars, and text, audio output signals, etc., commonly available for providing such interface features.

The interface 900 also includes a Location Input subwindow 914 that allows the user to zoom in on a floor map via a Map Zoom subwindow, and choose a floor for calibration via a Floor Chooser subwindow.

The interface 900 further includes a Scan Control subwindow 916 for selecting the scan rate (in Hertz) for signal detection. The user can also direct logging of the data to a location on the receiving device via a Logging path field 918. The user may also select a remote network storage location by entering the corresponding network path in the path field 918. Once entered, all data is automatically stored in the designated file location.

The IEEE 802.11 signal strength distributions were gathered by carrying the wirelessly connected laptop computer to different low-density calibration nodes in the building while making measurements of the signal strengths at those locations. These sixty-three low-density node locations are shown in FIG. 3A. The portable computer executed the data collection program for recording both locations and signal strengths. The program, one interface window of which is shown above in FIG. 9, allows the user to indicate his or her location by clicking on the floor plan map while simultaneously recording signal strengths from all "visible" IEEE 802.11 access points. The map makes it easy to indicate the device's approximate location for calibration. An alternative to using a map like this would be to measure points on the floor. However, this would be prohibitively time-consuming for calibrating a large building. Therefore, the positions on the map were approximated by standing in locations that were easy to identify on the map, like the centers of offices and intersections of hallways. The calibration locations were only as accurate as could be determined by selecting the positions on the map. However, this is a necessary compromise to reduce the calibration effort to a realistic level for larger deployments.

At each calibration location node, as illustrated in FIG. 3C, signal strength readings were taken for sixty seconds while slowly rotating the device in place. The rotational aspect was to factor out the effects of orientation. This is in contrast to a conventional system that modeled and recorded orientation explicitly. With this data, discrete probability distributions were constructed describing for each calibration point, the probability of seeing a given access point and the probability distribution of signal strengths from that access point. In mathematical terms, the calibration points are $\underline{x}_i^{(c)}$, $i=1 \ldots N_c$, and the building's access points are designated $AP_i$, $i=1 \ldots N_{AP}$. The probability of detecting access point $AP_i$ from calibration location $\underline{x}_j^{(c)}$ is $p(AP_i|\underline{x}_j^{(c)})$. This probability was estimated simply by the ratio of the number of times the access point was detected to the number of times all access points were scanned during calibration at the given calibration node. (Note that sixty seconds of scanning at a scan rate of 3.16 Hz translates to querying all access points approximately 190 times from every location.) This probability might be expected to be either zero or one, corresponding to being out of range or in range of an access point. The disclosed experiment shows that the probability takes on values between zero and one, as well, as shown in FIG. 7, which shows the histogram of the observed values of $p(AP_i|\underline{x}_j^{(c)})$ for all access points and all calibration node locations. Given this variation, it is important to model this effect.

If signals from an access point were measurable from a given location, then a normalized histogram of signal strengths was also constructed to represent $P(s_k \leq s < s_{k+1}|AP_i, \underline{x}_j^{(c)})$. Here s is the signal strength and the $s_k$ are the edges of the histogram bins. For this implementation, $s_k$ ranges from –120 dBm to 0 dBm in thirty steps. (Note that dBm denotes decibel milliwatts, and is the usual unit for IEEE 802.11 signal strength.) The overall result of the calibration captured both how often a given access point could be seen from a given location, and if it could be seen, the distribution of signal strengths. These probabilities embody the signal strength signatures that are used to infer a device's location from the signal strengths it observes.

Interpolating Signal Strength Distributions

The sixty-three calibration points were relatively widely spaced, with an average of approximately 2.64 meters to each point's nearest neighbor. It is desirable to achieve higher spatial resolution with a set of location nodes spaced more densely than the calibration nodes. As shown in FIG. 3A, the high-density location nodes are much more dense than the calibration nodes. In order to infer location over the dense set of location nodes, signal strength signatures need to be computed at each of the high-density location nodes. This means the probability distributions at the sparse set of calibration nodes needs to be extended into the denser set of high-density nodes. This is accomplished by interpolation, using radial basis functions.

From calibration measurements taken at the calibration nodes, the probabilities at the calibration points are known: $p(AP_i|\underline{x}_j^{(c)})$ describes the probability of seeing a given access point from a calibration point $\underline{x}_j^{(c)}$, and $p(s_k \leq s < s_{k+1}|AP_i, \underline{x}_j^{(c)})$ describes the distribution of signal strengths seen from an access point $AP_i$ at calibration point $\underline{x}_j^{(c)}$. What are wanted are the probabilities at the high-density location nodes, $\underline{x}_j^{(l)}$. The access point probabilities may be considered as a continuous function that was sampled at the calibration points. Likewise, the discrete probabilities of the signal strength distribution may be considered as a continuous function over 2-D space. To facilitate interpolation, the signal strength characteristics of each calibration point are represented by a vector $\underline{d}_j^{(c)}$ consisting of the access point probabilities and the discrete probabilities of the signal strength distribution from calibration point $\underline{x}_j^{(c)}$. More precisely, if there are $N_{AP}$ access points, and if signal strengths are discretized into K bins (i.e. $s_k$, k=1 . . . K), then the vector $\underline{d}_j^{(c)}$ has $N_{AP}$ elements representing the probability of seeing a given access point and an additional $KN_{AP}$ elements representing the signal strength distributions for each access point. (If the access point was not seen from a calibration point $\underline{x}_j^{(c)}$, then its signal strength distribution is set to all zeros.) Thus the goal is to interpolate from the calibration pairs $(\underline{x}_j^{(c)}, \underline{d}_j^{(c)})$, j=1 . . . $N_{(c)}$ to probabilities for the high-density location nodes $(\underline{x}_i^{(l)}, \underline{d}_i^{(l)})$, i=1 . . . $N_l$.

This interpolation is performed using normalized radial basis functions, which is a common choice for such tasks. The radial basis function formulation makes a weighted sum of a set of 2-D basis functions centered on the calibration points to produce the $k^{th}$ component of the $\underline{d}$ vector for the chosen point $\underline{x}$:

$$d_k(\underline{x}) = \sum_{j=1}^{N_c} \left( \frac{\beta_{jk} K(\|x - x_j^{(c)}\|)}{\sum_{l=1}^{N_c} K(\|x - x_l^{(c)}\|)} \right) \qquad (8)$$

For the kernel function K(r), it is chosen as $K(r)=\exp(-r^2/\sigma^2)$. After some experimentation, sigma was chosen to be $\sigma=1.0$ as a parameter that produced good results. The weights $\beta_{jk}$ were computed with standard least squares fitting to the calibration points.

Radial basis functions were evaluated at every location node $\underline{x}_i^{(l)}$, producing a corresponding vector of probability parameters $\underline{d}_i^{(l)}$. The parameters are then extracted to form the access point probabilities $p(AP_j|\underline{x}_j^{(l)})$ and signal strength probabilities $p(s_k \leq s < s_{k-1}|AP_j, \underline{x}_j^{(l)})$, thus going from probabilities at a relatively sparse set of calibration points to estimated probabilities at the denser set of location nodes. The normalized radial basis function is neither guaranteed to produce probabilities in the range [0,1] nor probability distributions that integrate to one. In practice it came close, however, requiring only slight clamping and normalizing to restore the proper range.

Inferring Location Using HMM

The basic ingredients of an HMM have been summarized as the following: states, initial state probabilities, transition probabilities, and observation probabilities. The states of the HMM for location are the high-density location nodes $\underline{x}_i^{(l)}$, i=1 . . . $N_l$ produced with the drawing program. With no other data about where a device might be located, the initial state probabilities $\pi_i$, i=1 . . . $N_l$ are uniformly distributed over the location nodes, i.e. $\pi_i=1/N_l$. The transition probabilities are described hereinabove, and are sensitive to the building's layout, expected pedestrian speeds, and the inference on whether or not the device is moving. The observation probabilities come from the interpolated probabilities, also described hereinabove.

For inferring location at time T the device scans for signal strengths from all access points. The result is an indicator vector $\underline{I}_T$ with one Boolean element for each of the $N_{AP}$ access points indicating whether or not the access point was detected. The other result is a vector of signal strengths $\underline{s}_T$ that gives the signal strength for each detected access point. Corresponding elements in these two vectors correspond to the same access point. If the access point was not detected, then the signal strength value for that access point can be any value, because it is not used. The probability of seeing this scan at location $\underline{x}_i^{(l)}$ is $$P(\underline{I}_T, \underline{s}_T | x_i^{(l)}) = \prod_{j=1}^{N_{AP}} \begin{cases} p(AP_j | x_i^{(l)}) p(s_{Tj} | AP_j, x_i^{(l)}) & \text{if } I_{Tj} = \text{true} \\ 1 - p(AP_j | x_i^{(l)}) & \text{if } I_{Tj} = \text{false} \end{cases} \qquad (9)$$

Here $I_{Tj}$ means the $j^{th}$ element of $\underline{I}_T$, and $s_{Tj}$ means the $j^{th}$ element of $\underline{s}_T$. Each multiplicand in this product represents one access point, implying that the scan result for each access point is independent of the other access points. If the $j^{th}$ access point was seen ($I_{Tj}$=true), then the multiplicand represents the probability of seeing this access point at the observed signal strength $s_{Tj}$. If the $j^{th}$ access point was not seen ($I_{Tj}$=false), then the multiplicand represents the probability of not seeing this access point.

These HMM elements are combined with the Viterbi algorithm to produce a set of state probabilities over the high-density location nodes, i.e., $p_T(\underline{x}_i^{(l)})$. For the final location estimate, the expected value of the location is as follows:

$$\underline{x}_T = \frac{\sum_{i=1}^{N_l} p_T(x_i^{(l)}) x_i^{(l)}}{\sum_{i=1}^{N_l} p_T(x_i^{(l)})} \qquad (10)$$

The disclosed architecture when used against the floor plan example provides significant improvements over conventional systems by reducing calibration effort and while improving accuracy. Because the constraints and dynamics of location nodes are carefully modeled, high accuracy is maintained in spite of reduced calibration, compared to conventional systems of this type. Application to the example herein showed a median error of approximately 1.53 meters without onerous calibration effort. In addition to location, the system also infers whether or not the device is moving, which can be an important indicator of the user's context.

Computing locations from IEEE 802.11 signal strengths is attractive because many office areas spaces are already wired with IEEE 802.11 access points, and more and more mobile devices will be equipped with wireless network hardware. While applied herein to IEEE 802.11 signals, the novel architecture may be easily applied to other types of location sensing, as indicated hereinabove, as well as serving as a platform for sensor fusion.

Figure 10:
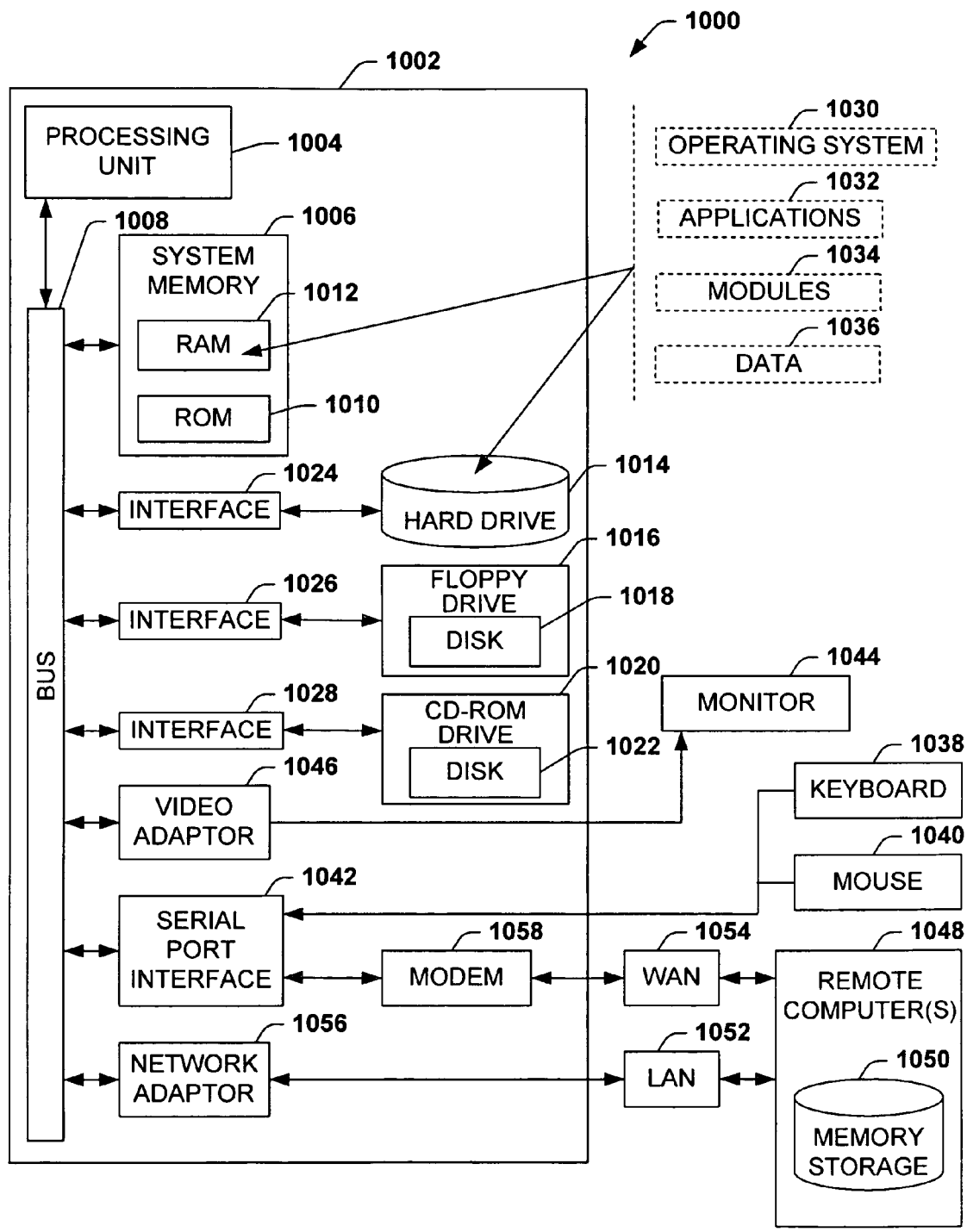
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the present invention, FIG. 10 and the following discussion are intended to provide a brief, general description of a suitable computing environment 1000 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 10, there is illustrated an exemplary environment 1000 for implementing various aspects of the invention includes a computer 1002, the computer 1002 including a processing unit 1004, a system memory 1006 and a system bus 1008. The system bus 1008 couples system components including, but not limited to the system memory 1006 to the processing unit 1004. The processing unit 1004 may be any of various commercially available processors. Dual microprocessors and other multiprocessor architectures also can be employed as the processing unit 1004.

The system bus 1008 can be any of several types of bus structure including a memory bus or memory controller, a peripheral bus and a local bus using any of a variety of commercially available bus architectures. The system memory 1006 includes read only memory (ROM) 1010 and random access memory (RAM) 1012. A basic input/output system (BIOS), containing the basic routines that help to transfer information between elements within the computer 1002, such as during start-up, is stored in the ROM 1010.

The computer 1002 further includes a hard disk drive 1014, a magnetic disk drive 1016, (e.g., to read from or write to a removable disk 1018) and an optical disk drive 1020, (e.g., reading a CD-ROM disk 1022 or to read from or write to other optical media). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The drives and their associated computer-readable media provide nonvolatile storage of data, data structures, computer-executable instructions, and so forth. For the computer 1002, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1012, including an operating system 1030, one or more application programs 1032, other program modules 1034 and program data 1036. It is appreciated that the present invention can be implemented with various commercially available operating systems or combinations of operating systems.

A user can enter commands and information into the computer 1002 through a keyboard 1038 and a pointing device, such as a mouse 1040. Other input devices (not shown) may include a microphone, an IR remote control, a joystick, a game pad, a satellite dish, a scanner, or the like. These and other input devices are often connected to the processing unit 1004 through a serial port interface 1042 that is coupled to the system bus 1008, but may be connected by other interfaces, such as a parallel port, a game port, a universal serial bus ("USB"), an IR interface, etc. A monitor 1044 or other type of display device is also connected to the system bus 1008 via an interface, such as a video adapter 1046. In addition to the monitor 1044, a computer typically includes other peripheral output devices (not shown), such as speakers, printers etc.

The computer 1002 may operate in a networked environment using logical connections to one or more remote computers, such as a remote computer(s) 1048. The remote computer(s) 1048 may be a workstation, a server computer, a router, a personal computer, portable computer, microprocessor-based entertainment appliance, a peer device or other common network node, and typically includes many or all of the elements described relative to the computer 1002, although, for purposes of brevity, only a memory storage device 1050 is illustrated. The logical connections depicted include a local area network (LAN) 1052 and a wide area network (WAN) 1054. Such networking environments are commonplace in offices, enterprise-wide computer networks, intranets and the Internet.

When used in a LAN networking environment, the computer 1002 is connected to the local network 1052 through a network interface or adapter 1056. The adaptor 1056 may facilitate wired or wireless communication to the LAN 1052, which may also include a wireless access point disposed thereon for communicating with the wireless adaptor 1056. When used in a WAN networking environment, the computer 1002 typically includes a modem 1058, or is connected to a communications server on the LAN, or has other means for establishing communications over the WAN 1054, such as the Internet. The modem 1058, which may be internal or external, is connected to the system bus 1008 via the serial port interface 1042. In a networked environment, program modules depicted relative to the computer 1002, or portions thereof, may be stored in the remote memory storage device 1050. It will be appreciated that the network connections shown are exemplary and other means of establishing a communications link between the computers may be used.

Figure 11:
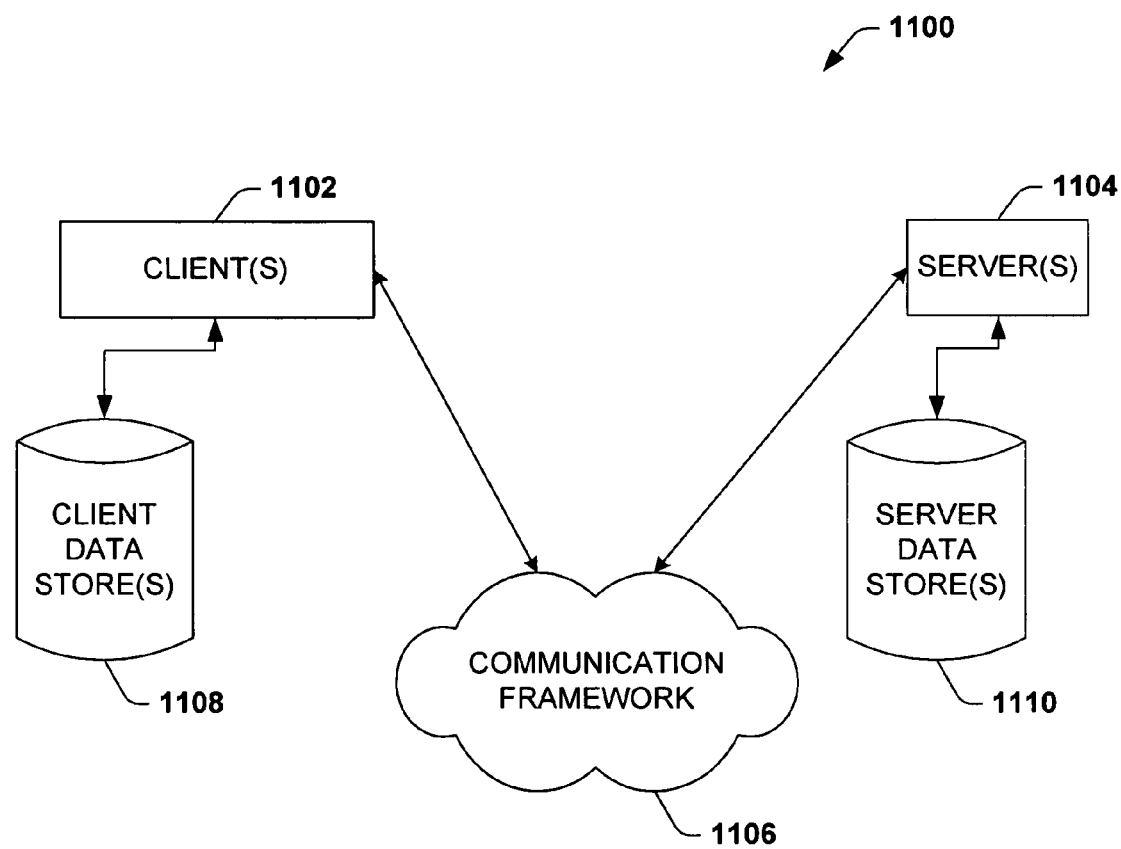
FIG. 11 illustrates a schematic block diagram of an exemplary computing environment in accordance with the present invention.

Referring now to FIG. 11, there is illustrated a schematic block diagram of an exemplary computing environment 1100 in accordance with the present invention. The system 1100 includes one or more client(s) 1102. The client(s) 1102 can be hardware and/or software (e.g., threads, processes, computing devices). The client(s) 1102 can house cookie(s) and/or associated contextual information by employing the present invention, for example. The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 may be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104. Communications may be facilitated via a wired (including optical fiber) and/or wireless technology. The client(s) 1102 are operably connected to one or more client data store(s) 1108 that can be employed to store information local to the client(s) 1102 (e.g., cookie(s) and/or associated contextual information). Similarly, the server(s) 1104 are operably connected to one or more server data store(s) 1110 that can be employed to store information local to the servers 1104.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of determining the location of a wireless measurement device, comprising:

developing a computer-based map of locations in which the wireless device will be used;

sparsely populating the map with low-density nodes each of which is associated with a respective location on the map;

training the locations by measuring signal properties received at calibration nodes associated with each of the low-density nodes;

generating signal strength distributions for each of the calibration nodes based upon the received signal properties;

populating the map with high-density nodes that are interspersed among the low-density nodes;

generating a transition probability for each pair of high-density nodes based upon path constraints between the nodes;

generating observation probabilities for each of the low-density location nodes;

processing the signal strength distributions, transition probabilities, and observation probabilities to generate a probability value for each high-density node; and interpolating the probability that the wireless device is at one or near one of the high-density nodes based upon the probability values of the low-density nodes.

2. The method of claim 1, further comprising generating a transition probability between a high-density node and a low-density node.

* * * * *